Figure 1:
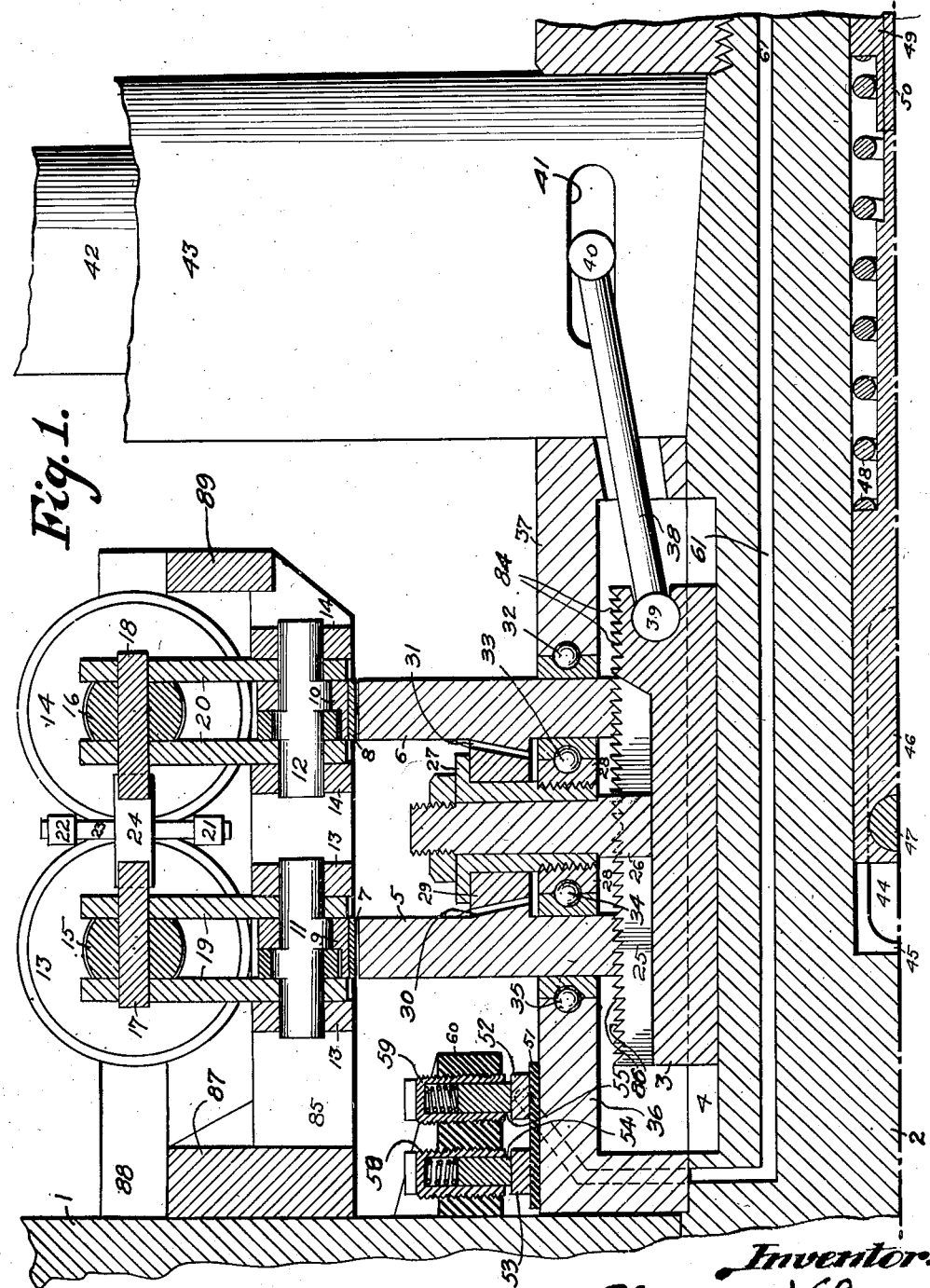

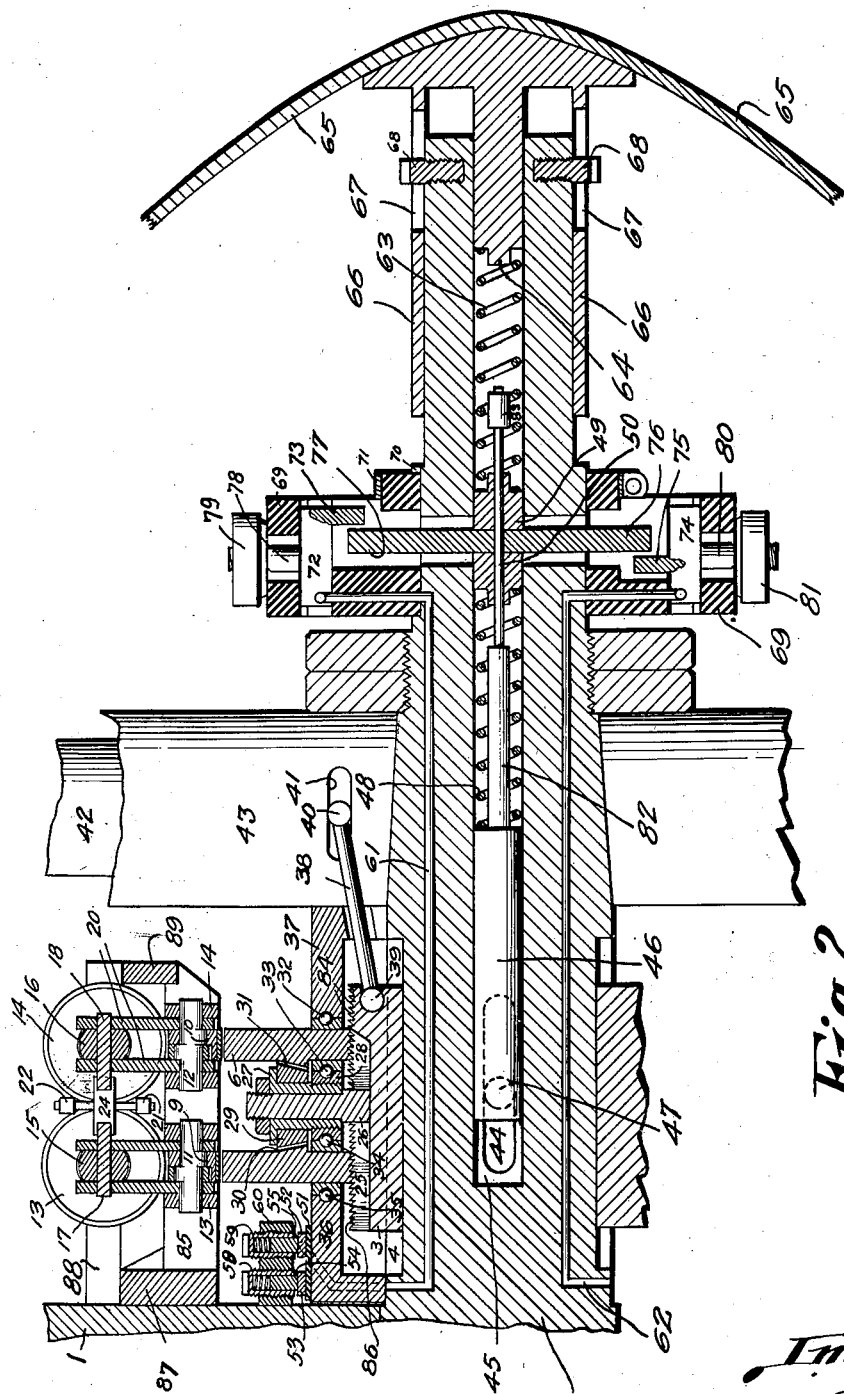

Patented Aug. 22, 1933

1,924,061

UNITED STATES PATENT OFFICE 1,924,061

AUTOMATIC VARIABLE PITCH PROPELLER

Chandley W. Lambert, Cleveland, Ohio

Application September 21, 1932
Serial No. 634,354

9 Claims. (Cl. 170—162)

The invention relates to variable pitch propellers in which the pitch is changed by the application of engine power, controlled by the variation of air pressure on a movable pressure plate, due to change of air speed.

The present invention is an improvement of previous inventions, U. S. Pat. #1,874,053, and also of Serial #619,481, filed June 27, 1932.

One form of the invention is shown in the accompanying drawings. Parts are numbered the same in all figures of the drawings.

Fig. 1 is a longitudinal cross section showing part of the invention, particularly the power application to the blade shank; and Fig. 2 is a similar section, in smaller scale, showing more of the control and its connection to the power application of Fig. 1.

In Fig. 1, 1 represents a part of the engine crank case; or it may be a part of the fuselage; from which propeller shaft 2 extends. 3 is a collar, feathered at 4 on shaft 2, and restrictedly slidable in longitudinal directions.

Collar 3 has external threads, one half being right hand threads, 83, and the other half left hand, 84. These threads mesh with internal threads on brake wheels 5 and 6.

Brake linings 7 and 8 on brake shoes 9 and 10, actuated by cams on pins 11 and 12, operate to retard or stop the revolution of wheels 5 or 6, which are normally revolved at the same speed as shaft 2.

Pins 11 and 12, in bearings 13—13 and 14—14, are secured to lever arms 19 and 20, which are secured by pins 17 and 18 to movable solenoids 15 and 16 of electromagnets 13 and 14, which are secured to bracket 88, which is secured to crank case 1. Annular rings 87 and 89 serve to stiffen the brackets, and on the opposite side of the shaft,—not shown—support an anchorage for the brake shoes.

Bearings 21 and 22 support rocker shaft 23 and rocker arm 24, which, by contacting pins 17 and 18, forms a mechanical interlock to prevent simultaneous application of brakes on both wheels.

Collar 3 has a keyway 25 in which fits the flattened end of pin 26 on which sleeve 27 is secured to annular ring 28. On sleeve 27 is bevel gear 29, meshing with bevel gears 30 and 31 on sides of brake wheels 5 and 6.

Annular thrust ball bearings 32, 33, 34, 35 are contained between the annular ring 28, wheels 5 and 6, and annular end bells 36 and 37, which are secured to shaft 2.

Within hollow 45, of shaft 2, bolt 46 may slide longitudinally. Transverse bar 47, secured at its ends to collar 3, passes through closed slot 44 in shaft 2 and also through bolt 46. Bolt 46 bears against compression spring 48, which bears against control plate 49. An extension 50 of bolt 46 passes through control plate 49 as explained below.

On end bell 36 is annular insulating ring 51, collector rings 52 and 53, contacting brushes 54 and 55, held in contact by springs 56 and 57, in brush holders 58 and 59, which are insulated by insulating bracket 60, which may be attached to crank case 1, as shown, or to bracket 85.

Link 38 has swivel connections 39 and 40 to collar 3 and a radial arm connected to propeller blade shank 42 through closed slot 41 in hub 43.

In Fig. 2, 2 is the shaft, 3 the collar feathered in keyway 4 of shaft 2. 61 and 62 are openings for the insulated wires connecting collector rings 52 and 53, Fig. 1, to contacts 72 and 74, Fig. 2. Bolt 46 slides in hollow 45 of shaft 2. Bolt 46 is moved by pin 47 moving in slot 44 in shaft 2. The ends of pin 47 are secured to collar 3. Bolt 46 has an extension 82, a further extension 50 passing through control plate 49, and on extension 50 is a stop 83.

48 and 63 are compression springs. 64 is a small shaft extension to compress spring 63 by fluid pressure on conical pressure plate 65 which is guided by sleeve 66 on shaft 2 and limited in action and caused to revolve by set screws 68—68' in closed slot 67 in sleeve 66.

69 is an annular insulating contact holder, which may be in two halves, keyed to shaft 2 at 70, and secured by band 71. 72 and 74 are electrical terminals having shoulders 73 and 75 which may be contacted by movable contacts 76 or 77, which are secured to control plate 49, which is actuated by balancing compression springs 48 and 63. These parts comprise the selective switch which energizes either electromagnet 13 or 14, independently but never simultaneously.

To contact terminals 72 and 74 are secured studs 78 and 80, having nuts 79 and 81, by which the contact clearances of switches 73—77 and 76—75 may be adjusted.

The device operates as follows:—Increase of air-speed increases pressure on plate 65, compresses spring 63, closes contacts 76—75, completes the electrical circuit thru coil 13 by grounding contact 75 to shaft 2. Solenoid 15 rocks pin 11, and the cams set the brakes 7 on brake wheel 5, which is thereby retarded. Wheel 6 is accelerated to the same extent because gear 29 is carried around at shaft speed. Right hand threads 86 on collar 3, and thrust bearing 35, cause collar 3 to move to the right. Link 38 rotates shank 42 and turns the attached blade to a position of higher pitch. At the same time pin 47 is carried to the right, compressing spring 48, until it balances spring 63, when contact 76—75 opens, coil 13 is de-energized and brake shoe 9 on wheel 5 is released by brake release springs, not shown, and the pitch of the blades is correct for the airspeed at the instant pertaining.

Decrease of airspeed removes pressure from spring 63. Spring 48 moves contact arm 77 against contact 73, coil 14 is energized, and the brake wheel 6 is retarded. 84 being a left hand thread, collar 3 moves to the left and shank 42 is rotated into a position of lower pitch. Bolt 46 meantime moves to the left, relieving pressure on spring 48, which now balances spring 63. Control plate 49 returns to the central or neutral position, contact 73—77 is broken, brake wheel 6 is released, and wheels 6 and 5 rotate at shaft speed.

Should the collar 3 arrive at the extreme limit of its movement, for either high or low pitch, stop 82 or else stop 83 will have contacted control plate 49, preventing the selective switch from closing the circuit for further motion in that direction.

The advantages of variable pitch are many. Short take-off run; steep climbing ability; higher maximum speed in level flight; and ability to rise from the ground with greater pay load.

Automatic variable pitch introduces a considerable safety factor. As the plane approaches the stalling condition, the pitch is automatically reduced, and the motor is able to pull out of the unfavorable condition without stalling, loss of altitude, and without human attention. The spin and possible crash are avoided. The human equation is largely eliminated.

The automatic control causes the pitch angle of the propeller blades to closely follow any change of air speed of the plane. Increase of maneuverability and safety are combined with greater efficiency of operation.

I claim:—

1. A propeller shaft, a hub secured to said shaft, a propeller blade shank rotatable relatively to said hub, a collar slidable on said shaft, means for rotating said shank by said collar, brake wheels cooperating with said collar, means controlling operation of brake shoes on said brake wheels, selective means cooperating with said collar and a pressure plate for operating said control means.

2. A propeller shaft, a hub secured to said shaft, a propeller blade shank rotatable relatively to said hub, a collar slidable on said shaft, means for rotating said shank by movement of said collar, brake wheels cooperating with said collar, brake shoes cooperatively associated with said brake wheels, means for applying said brake shoes to said brake wheels, a restrictedly slidable fluid pressure plate on said shaft forwardly of said hub, opposing compression springs cooperating with said collar and said pressure plate for selectively controlling said brake applying means.

3. A propeller shaft, a hub secured to said shaft, a rotatable propeller blade shank, a collar on said shaft, cooperative means associated with said collar and said shank; external, divided, opposite handed threads on said collar; brake wheels cooperating with said threaded collar, brake shoes cooperating with said wheels, interlocking selective means for applying said brake shoes to said brake wheels, a compression spring cooperating with said collar, a control plate cooperating with said spring, a second opposing compression spring cooperating with said control plate, a fluid pressure plate cooperating with said second spring, a control means cooperating with said control plate and said brake applying means.

4. A propeller shaft, a hub secured to said shaft, a propeller blade shank rotatable in said hub, a movable fluid pressure plate, a collar on said shaft, means for rotating said shank by movement of said collar on said shaft, divided opposite threads on said collar, brake wheels cooperating with said threads, brake shoes cooperating with said brake wheels, electrical means controlling the operation of said brake shoes, a selective switch controlling said electrical means, compression springs cooperating with said collar and said pressure plate for operating said switch.

5. A propeller shaft, a hub secured to said propeller shaft, a rotatably mounted blade shank coaxial with said hub, a slidable collar on said shaft, means for revolving said collar with said shaft, means for rotating said shank by sliding motion of said collar, divided right and left hand external threads on said collar, brake wheels cooperating with said threaded collar, brake shoes cooperatively associated with said wheels, electromagnets cooperating with said brake shoes, a selective switch controlling said electromagnets, a fluid pressure plate, means cooperating said collar and said pressure plate for operating said switch.

6. An automatic variable pitch propeller of the form described in claim 5, and means causing one brake wheel to accelerate proportionately as the other brake wheel is retarded.

7. A pitch changing device of the form described in claim 5, and mechanical interlocking means preventing simultaneous application of the brake shoes.

8. A mechanism of the form described in claim 5, and means limiting the application of controlled power in reverse directions to said collar.

9. A device of the form described in claim 5, and means causing one brake wheel to be accelerated proportionately as the other brake wheel is retarded, mechanical interlocking means preventing simultaneous application of said brake shoes, means cooperatively associated with said collar limiting the extent of application of controlled power in reverse directions to said collar.

CHANDLEY W. LAMBERT.